United States Patent [19]

Madsen et al.

[11] Patent Number: 4,968,694
[45] Date of Patent: Nov. 6, 1990

[54] FIBER-CONTAINING PRODUCT, A PROCESS FOR THE PREPARATION THEREOF, AND THE USE THEREOF

[75] Inventors: Rud F. Madsen, Nakskov; Kirsten Buchbjerg, Videbaek; Ole R. Jensen, Roskilde, all of Denmark

[73] Assignee: Danisco A/S, Copenhagen, Denmark

[21] Appl. No.: 64,698

[22] Filed: Jun. 22, 1987

[30] Foreign Application Priority Data

Jun. 25, 1986 [DK] Denmark .............................. 2987/86

[51] Int. Cl.$^5$ ........................ A61K 31/00; A23L 1/00; A23G 3/00; C08B 37/00
[52] U.S. Cl. ........................................ 514/23; 536/128; 536/1.1; 514/866; 426/634; 426/660; 426/653; 426/574; 426/652; 426/105; 426/443; 426/461; 426/464; 426/482; 426/484; 424/439; 424/440
[58] Field of Search .................. 514/23, 866; 536/128, 536/1.1; 426/634, 660, 653, 105, 574, 652, 443, 461, 464, 482, 484; 424/439, 440

[56] References Cited

U.S. PATENT DOCUMENTS

| | | | |
|---|---|---|---|
| 2,278,484 | 4/1942 | Plews | 426/634 |
| 4,259,358 | 5/1981 | Duthie | 426/46 |
| 4,428,876 | 1/1984 | Iwamura | 536/128 |
| 4,794,011 | 12/1988 | Schumacher | 426/448 |

FOREIGN PATENT DOCUMENTS

| | | |
|---|---|---|
| 20499/83 | 10/1983 | Australia . |
| 0073581 | 3/1983 | European Pat. Off. . |
| 2014423 | 8/1979 | United Kingdom . |

OTHER PUBLICATIONS

Food Technology, vol. 38, No. 1, Jan. 1984, pp. 64, 65, 68, 69, Chicago, Ill., U.S.A.; J. L. Vetter: "Fiber as a Food Ingredient".

*Primary Examiner*—Ronald W. Griffin
*Assistant Examiner*—Everett White
*Attorney, Agent, or Firm*—Oblon, Spivak, McClelland, Maier & Neustadt

[57] ABSTRACT

A fiber-containing product based on seeds of leguminous plants comprises the cell wall ingredients of the seed, said ingredients being isolated upon previous removal of the seed coat. The product is prepared by whole seeds of leguminous plants being shelled to remove the cellulose-containing seed coat and being rinsed and steamed for bacteriological reasons are wet-ground to open the plant cells and to dissolve or suspend the starch particles, proteins, and soluble components contained in the plant cells; whereafter proteins, salts, soluble ingredients, and starch particles are removed as a filtrate through a filtration on a centrifugal sieve followed by a washing, filtration, and pressing of the resulting filter cake to increase the dry matter content before the filter cake is rasped and dried. The fiber product can be used when preparing e.g. an expanded and crisp product or for prophylactic or relieving treatment of human beings or animals, where the fiber-containing product is administered in an effective prophylactic or relieving amount depending on the condition being treated.

17 Claims, 1 Drawing Sheet

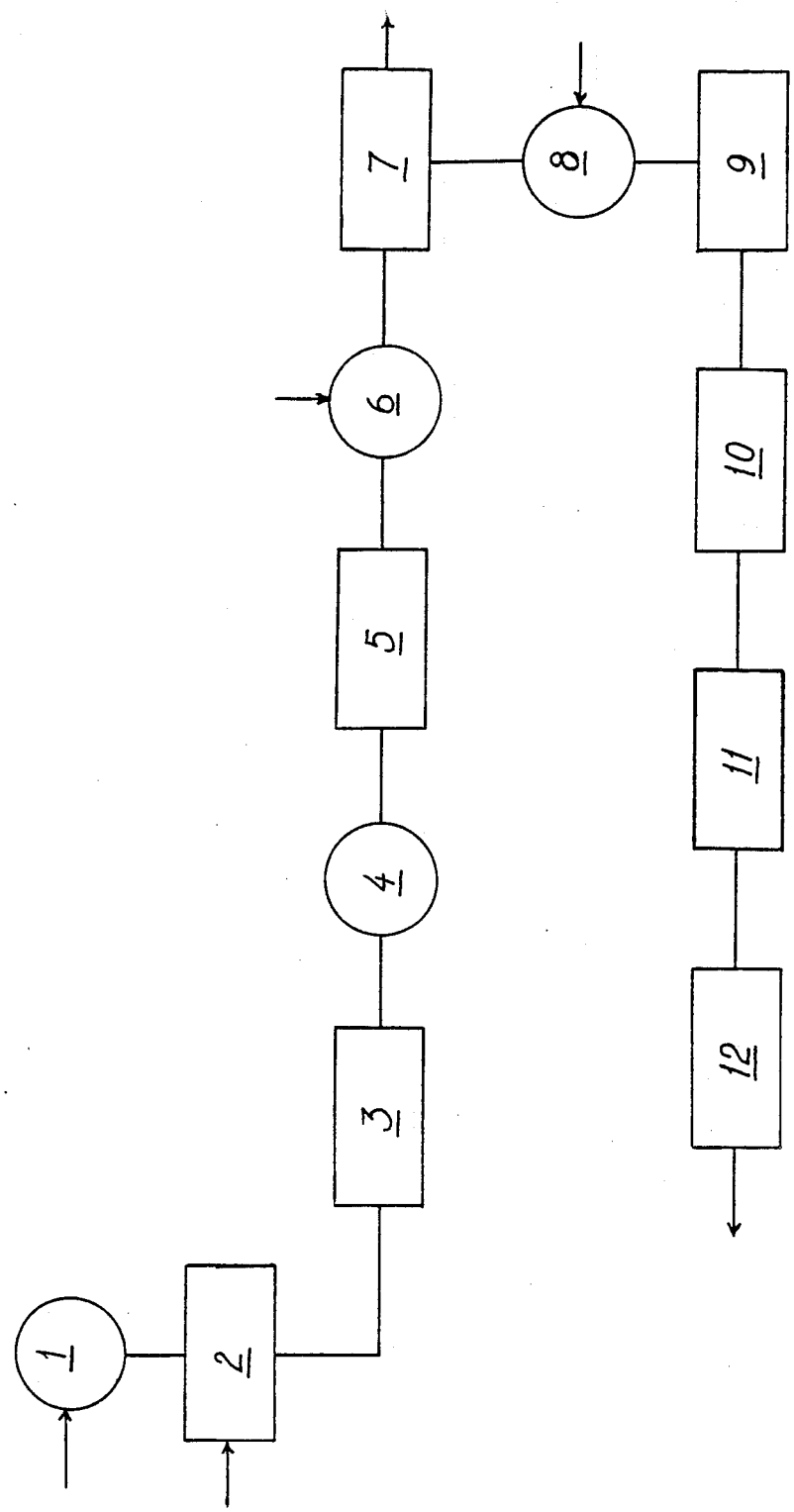

FIBER-CONTAINING PRODUCT, A PROCESS FOR THE PREPARATION THEREOF, AND THE USE THEREOF

The invention relates to a fiber-containing product based on seeds of leguminous plants, as well as to a process for the preparation thereof, and the use thereof especially for nutrients, stimulants, and feedstuffs.

Modern human beings and even animals, especially pets, usually intake an insufficient amount of fibers with their daily diet. This is believed to be a contributory cause to a number of unpleasant effects and diseases including so-called welfare diseases, such as colitis bulges of the colon, cardiovascular disorders, diabetes, gallstones, and kidney stones. The theory has even been presented that a lack of fiber in the daily intake of food can be a contributory cause to the development of cancer of the stomach. Generally speaking, the intake of food containing many fibers is beneficial for digestion. As such a fiber containing food counteracts both constipation and diarrhoea.

Additional reasons exist for maintaining a high daily intake of fiber-containing food, viz. that upon intake the fibers have a filling effect without being fattening and that they can be carriers for important substances such as salts, trace elements, and vitamins.

A market exists already for fiber containing products used for relieving a fiber deficiency in the food of many human beings and some animals. Most fiber-containing products on the market are cellulose-containing shell-fractions, such as for instance bran, or whole ground parts of plants, such as for instance seaweeds, or production residues from the preparation of nutrients and feedstuffs and other products, such as juice and oils.

An intake and especially an excessive intake of a number of these known products can involve undesired side effects, such as formation of blockages in the oesophagus and the intestines, as well as a reduced absorption of important food ingredients, such as calcium, iron, and zinc. The latter draw-back applies especially to the intake of bran fibers, the content of which of phytic acid can bind the minerals calcium, iron, zinc etc. so as to make them non-absorbable.

A further disadvantage of many of the known fiber products is a rather unpleasant taste and in some cases an unpleasant appearance. In addition most known products are prepared by dry-grinding and not removing possible, residues of chemicals resulting from growth, which implies that manufacturers have to carry out expensive control analyses frequently in order to ensure that residues of chemicals cannot be found in their products.

Many known fiber products possess only a poor waterabsorbing effect and are used for increasing the fiber content of a product or merely as a filler and not because of a particular functional effect utilizable for instance by an extrusion process. This is a disadvantage both in relation to their use when preparing nutrients and feedstuffs and in relation to their digestion and defecation control ability. It is a recognized fact that fibers binding water in the digestion system contribute to a relatively fast passage of the food through the intestine, and that this is desirable because the probability of formation of carcinogenic substances in the intestine is assumed to be less than usual. In order to overcome inter alia the problems of the known products, a shell free fiber product has been invented which is based on seeds of leguminous plants. The shell is, in the present application, to be understood as the covering of each seed such as each pea seed.

Thus the present invention relates to a fiber-containing product based on seeds of leguminous plants, said product being characterised by comprising the cell wall ingredients of the seed, said ingredients being isolated upon removal of the seed coat.

The product according to the invention contains hemicellulose, pectin, starch, and protein, whereby the content of cellulose and lignin is very low.

The fiber material of the present fiber product derives from cell wall ingredients of the shelled seeds of leguminous plants. Unlike most fiber products on the market the product according to the invention includes thus substantially no cellulosecontaining shells. Unlike the above known fiber products the fiber material according to the invention can be extruded into an expanded and crisp product.

Typically the product according to the invention is white, of a grain size of 1-2 mm, and has a neutral taste. In addition it is typically able to bind an amount of water corresponding to 10.15 times its own weight. A granular product according to the invention can, if desired, be dry-ground to a predetermined particle size without particular measures.

A particular advantage of the product according to the invention is the good functional effects thereof. Thus the product can through extrusion and without the addition of any substances provide an expanded and crisp product. Furthermore it is able to bind water corresponding to 10–15 times its own weight. Unlike other known fiber products the product according to the invention is neutral with respect to taste and color, which makes it suitable as an adjuvant for a wide range of nutrients. With respect to nutrition the product is of a very fine composition.

A further important advantage of the present invention is that possible residues of chemicals resulting from the growth of the plant optionally remaining from the use of one or more pesticides have been substantially removed by the wet-grinding process and the repeated washing of the fibers, which does not apply to the use of a conventional dry-grinding process. Examples of pesticides—the presence of which can be avoided in the product according to the invention—are the herbicides, such as Trifluralin, Dinoseb, Bladex, Basagran 480, Fervin, Fusilade, Glyphosat, Diquat-Dibromid; the fungicides such as Captan, Maneb, Ronilan, Rovral, and Daconil; as well as insecticides, such as Parathion, MetaSystox SO, Ekatin, Pyretroides, Pirimor G, and Fenitrothion.

The invention relates furthermore to a process for preparing the fiber-containing product dealt with, said process being characterised in that whole seeds of leguminous plants - being shelled to remove the cellulose-containing seed coat and being rinsed and steamed for bacteriological reasons - are wetground to open the plant cells and to dissolve or suspend the starch particles, proteins, and soluble components contained in the plant cells; whereafter proteins, salts, soluble ingredients, and starch particles are removed as a filtrate through a filtration on a centrifugal sieve followed by a washing, filtration, and pressing of the resulting filter cake to increase the dry matter content before the filter cake is rasped and dried.

Thus the procedure is as follows: Initially whole seeds of leguminous plants are shelled to remove the cellulose-containing shell at the same time as a rinsing and steaming are carried out for bacteriological reasons; whereupon the shelled seeds are wet-ground to open the plant cells and to dissolve or suspend the starch particles, proteins, and soluble ingredients contained in the plant cells; whereafter proteins, salts, soluble ingredients, and starch particles are removed as a filtrate through a filtration in a manner known per se, e.g. on a centrifugal sieve and the resulting filter cake is resuspended and filtered. The washed filter cake is pressed to increase the dry matter content before the filter cake is rasped and dried.

Most other known fiber products are either produced by dry-grinding of shells or a dry-grinding of whole raw materials followed by a coarse separation of fibers by air flow separation. By the process according to the invention the shells are removed in advance whereafter the split seeds are wet-ground. Besides the fibers are washed repeatedly in clean water which removes detrimental nutritional, taste, and color components. The use of the process according to the invention allows furthermore the possibility of well defined alteration of the chemical composition by means of various sieves.

In an embodiment of the process according to the invention whole peas are subjected to a shelling process where the cellulose containing shell is removed. At the same time the bacteriological quality is improved by rinsing and steaming. In this manner the resulting product can be accepted by the authorities as additive to nutrients, viz. also stimulants and feedstuffs.

In this manner the resulting shelled peas are wet-ground on a coarse-grinding mill followed by a fine-grinding mill to open the plant cells and to dissolve or suspend the contents thereof of starch particles, protein, and soluble components.

By a sieving operation which follows, which is preferably carried out by means of a centrifugal sieve, protein, salt, and soluble carbohydrates follow the filtrate. The use of a sieve implies that the majority of the starch particles follow the filtrate too.

The resulting fiber-containing fiber cake is washed and sieved again on a centrifugal sieve, whereafter the fiber cake is pressed preferably in a screw press to a dry matter content of approx. 30% by weight, and then rasped, e.g. by passing through an Alexander rasping apparatus, followed by a drying in a fluidized bed.

The only chemical used by this treatment is a very small amount of NaOH for a pH-value adjustment after the grinding.

Unlike other fiber products the product according to the invention is remarkable for its good functional effects.

The product according to the invention is able to expand through extrusion which makes it particularly suitable for preparing crisp products. It is furthermore possible to utilize the excellent waterbinding effect of the product for instance in minced meat and sausages products because such a waterbinding effect counteracts waste by processing, such as cooking, frying, boiling, and smoking, as well as contributes to maintaining the shape and desired consistency of the product.

The neutral taste and acceptable colour of the fiber product allows the use thereof as an adjuvant in a wide range of nutrients, stimulants, and feedstuffs, for instance butcher's articles such as burgers and other minced meat products, soups, snacks, breakfast articles, and confectionery, as well as various types of feedstuffs especially for pets. Thus the use is particularly based on the desire for a functional effect in the end products, e.g. an increased binding of water in the burger, or on the desire for both a functional effect and a fiber enrichment of for instance chocolate and snacks. With respect to nutrition the use of fiber presents the advantage that the fibers per se having a good nutritional composition in many cases substitute other more energy-providing, i.e. fattening, ingredients.

An advantage of the product according to the invention is that it can be a part of a product which is used for prophylactic purposes and/or for treatment of the diseases mentioned supra.

Consequently, the invention relates also to the use of a fiber-containing product according to the invention for prophylactic purposes or for the treatment of human beings or animals, said use being characterised by administering the fiber-containing product in an effective prophylactic or relieving amount depending on the condition being treated.

By a particularly advantageous embodiment of the invention a fiber containing product according to the invention is used for preparing a composition reducing the increase of the blood glucose level resulting from intake of glucose or a glucose-metabolizable material.

It has turned out that compared to corresponding compositions containing wheat bran or beet fibers, such a composition has a surprisingly better postprandial blood glucose response.

The product according to the invention can be prepared with varying particle size. Thus in some cases the product can be used with a particle size of 1-2 mm. which corresponds to the particle size obtained immediately after drying. For other purposes the product can be prepared with a particle size of 15-20 (grinding on a mill of the type Alpine ZPS can be employed). For other purposes, a product with a particle size of 200-400 can be used, such a particle size being obtained by grinding on a mill of the type Alpine UPZ.

The process according to the invention is illustrated more detailed in the following Example 1 and with reference to the accompanying drawing showing a flow sheet of the treatment according to the invention.

The use of a fiber containing product according to the invention is compared to the use of known fibercontaining products in Example 2.

EXAMPLE 1

The present Example uses fully ripe shelled peas Pisum sativum. 200 kg/h of shelled peas (1) are dosed (2) together with 800 kg/h of water to a mill (3) (Fryma MK 180), where the mixture is subjected to a coarse grinding. The coarsely ground mixture is suspended (4) and transferred to a mill (5) (Fryma corundum stone mill MK 250), where the mixture is subjected to a fine grinding in order to ensure that approx. 40% of the insolved particles have a particle size of less than 30$\mu$. The suspension is subsequently carried to a tank (6) in which the pH-value is adjusted to 6.8 through addition of 2N NaOH-solution. The resulting material is stirred in the tank (6) for about half an hour whereby a good extraction of the protein content and soluble ingredients of the peas is obtained. Now the temperature is approx. 18° C. The suspension adjusted to a pH-value of 6.8 is subsequently carried to a sieve (7)- (Jesma sieve provided with a net of 100$\mu$). A fraction of protein, starch, and soluble carbohydrates is removed from the sieve (7). The remaining fiber material is carried to a tank (8) with a stirrer. In the tank (8) the material is suspended in water in the weight ratio of 1:1, whereafter the resulting suspension is carried to a sieve (9) (Jesma sieve provided with a net of 100μ). At this step of the process further protein, starch, and taste components are removed whereafter the resulting product is carried to a press (10) (screw press; Stord-Bartz P 13), where the dry matter content of the fiber fraction is increased to approx. 30% by weight of solid. The fiber cake pressed in the press (10) is so dry that it can be rasped on a rasping device (11) (Alexander-rasping device, Alexanderwerk Reibschnitzler type Ran-S). The rasped product is carried to a drying apparatus (12) (Vibro Fluidizer; Niro Atomizer). 98% of the fiber product resulting from the drying have a particle size of less than 2 mm.

EXAMPLE 2

The present Example illustrates:

Blood sugar rise oro-cecal transit time, intestinal fermentation, and starch absorption upon administration of 3 different types of fiber to sound adults.

The purpose of the test was to determine the influence of wheat bran, beet fibers, and pea fibers according to the invention on:
 a) absorption of wheat starch
 b) postprandial blood glucose rise
 c) oro-cecal transit time Furthermore the fermentation of the three fiber types in colon is illustrated concerning development of hydrogen.

Method: To 8 sound test persons of a standard weight (average age of 28 years, 22-31) are in randomized sequence administered the following test meals:
 a) Bread baked of 100 g of wheat flour,
 b) Bread baked of 100 g of wheat flour without gluten
 c) Bread baked of 100 g of wheat flour plus 36 g of wheat bran
 d) Bread baked of 100 g of wheat flour plus 22 g of beet fibers
 e) Bread baked of 100 g of wheat flour plus 30 g of pea fibers
 f) The individual fiber types in the same doses but separately
 g) A standard meal alone
 h) A standard meal plus the individual fiber types separately in the same dose The standard meal included 150 g of steak, 50 g of glucose, and 20 g of lactulose.

By all the tests the hydrogen (H$_2$)-concentration was measured in the expiration air every 30 min. for 8 hours, as a measure of the fermentation in colon of the fiber type in question.

Results:

| % of non-absorbed starch (median; range = 95% CF) | | |
|---|---|---|
| Wheat starch | 8 | (4–17) |
| Wheat starch without gluten | 0 | (0–6)[a] |
| Wheat starch plus wheat bran | 12.5 | (5–22)[a] |
| Wheat starch plus beet fibers | 12.5 | (5–22)[a] |
| Wheat starch plus pea fibers | 12 | (5–27)[a] |
| Oro-cecal transit time min. (median; range = 95% CF) | | |
| Wheat starch | 360 | (210–420) |
| Wheat starch plus wheat bran | 165 | (120–300)[a] |
| Wheat starch plus beet fibers | 240 | (90–360)[a] |
| Wheat starch plus pea fibers | 270 | (90–300)[ab] |
| Postprandial blood glucose response | | |
| | Peak value (mmol/l) | AUG (mmol/l × t) |
| Standard meal alone | 7 | 90 |
| plus wheat bran | 5.3 | 54 |
| plus beet fibers | 6.4 | 68 |
| plus pea fibers | 5.7[a] | 28[a] |

[a] = statistic significant different from wheat starch alone.
[b] = statistic significant different from wheat starch plus wheat bran.
AUC = area below the blood glucose versus time graph. Calculated as BS × t, from the starting point to the point of intersection with the starting value. Only pea fibers disclose significantly differing values from the standard meal alone. The pea fibers reduce AUC by 69%.

For use within the confectionary branch, e.g. for chocolate or chewing gum, a product with a particle size of 15-20 is usually employed. For liquorice a particle size of preferably approx. 200 is used. For the use within the meat industry, e.g. for minced meats and sausages including meat balls, burgers, pâtés and frankfurters, a particle size of 1-2 mm as well as 200-400 can be employed. For use within the bakery industry a product with a particle size of 200-400 mm is usually employed.

EXAMPLE 3

The inventive product can be used in an extruded liquorice having the formulation:

| | |
|---|---|
| English syrup | 300.0 kg |
| Invert syrup | 100.0 kg |
| Glucose syrup | 25.0 kg |
| Raw liquorice | 30.0 kg |
| Modified starch | 40.0 kg |
| Wheat flour | 180.0 kg |
| Pea fibers | 40.0 kg |
| Salt | 1.5 kg |
| Water | 20.0 kg |
| Flavourings | q.s. |

The pea fibers employed have a particle size of approx. 200.

EXAMPLE 4

Fiber according to the invention are used in a pâté of the following formulation:

| | | |
|---|---|---|
| Liver | 30.0% | by weight |
| Fat | 30.0% | by weight |
| Broth | 34.0% | by weight |
| Wheat flour | 3.0% | by weight |
| Spices | 0.5% | by weight |
| Fibers | 1.5% | by weight |
| Vegetable protein isolate | 1.0% | by weight |

EXAMPLE 5

Fibers according to the invention can be used in a frankfurter of e.g. the following formulation:

| | | |
|---|---|---|
| Scrap beef meat | 17.0% | by weight |
| Pork jowl butt | 25.0% | by weight |
| Meat from the head | 7.0% | by weight |
| Mechanically deboned meat | 6.0% | by weight |
| Vegetable protein isolate | 3.5% | by weight |
| Tari K7A | 0.4% | by weight |
| Ascorbic acid | 0.05% | by weight |
| Wheat flour | 2.0% | by weight |
| Potato flour | 3.0% | by weight |
| Nitrite salt | 1.0% | by weight |
| Salt | 0.8% | by weight |
| Fibers | 3.0% | by weight |

| | |
|---|---|
| -continued | |
| Water/ice | 31.25% by weight |

EXAMPLE 6

The fiber-containing product according to the invention having a particle size of 1-2 mm can be used in a burger and has the following formulation:

| | |
|---|---|
| Beef lump | 75% by weight |
| Beef tallow | 4% by weight |
| Fibers | 4% by weight |
| Water | 16% by weight |
| Salt | 1% by weight |

The advantage of using fibers according to the invention is a reduced shrinkage during frying. It has thus been demonstrated that the fibers used in the above formulation compared with other water-inding ingredients and normally used with burgers in the same formulation result in a lesser shrinkage during frying of 5-10%.

Compared with burgers prepared without the addition of water-binding ingredients and thus prepared without the addition of water, which reduces the result compared to burgers with fibers, the shrinkage during frying is reduced by approx. 10% in burgers with addition of fibers according to the invention.

EXAMPLE 7

The fiber-containing product according to the invention having a particle size of 200-400 can be used for a white bread having the following formulation:

| | |
|---|---|
| Wheat flour | 800 g |
| Fibers | 200 g |
| Sugar | 12 g |
| Salt | 12 g |
| Yeast | 50 g |
| Margarine | 50 g |
| Water | 783 g |

EXAMPLE 8

The fiber containing product according to the invention having a particle size of 200-400 can be used for a biscuit having the following formulation:

| | |
|---|---|
| Wheat flour | 480.0 g |
| Fibers | 120.0 g |
| Shortening | 130.0 g |
| Skimmed milk | 21.0 g |
| Icing sugar | 13.0 g |
| Salt | 7.0 g |
| Ammonium carbonate | 15.0 g |
| Sodium hydrogen carbonate | 3.0 g |
| Tataric acid | 0.3 g |
| Sodium disulphide | 0.2 g |
| Water | 260.0 g |

EXAMPLE 9

In this example fibers derived from peas, Pisum sativum, are used. The fibers are extruded by means of a Werner & Pfleiderer C 37 double-disk extruder with the following three-zone configuration:

1) A feeding zone cooled down to 15°-20° C. by water
2) A heating zone heated to 120° C. by oil
3) A heating zone heated to 130° C. by oil.

The worm includes conveying elements interrupted by mixing elements with a recirculation device in the last zone. At the end of the extruder there is provided a nozzle plate with two nozzles, each with a diameter of 5 mm.

After the extrusion the products are dryed at 60° C. for 60 min in a hot air drying oven. Good expanded products are obtained, said products possessing a density of 200-300 g/l and providing a good texture The products are suitable for use as pub snacks or the like, suitable spices being added.

We claim:

1. A fiber-containing product based on seeds of leguminous plants, which is prepared from the cell wall ingredients of the seed, said ingredients having been isolated subsequent to removal of the seed coat from the seeds.

2. The fiber product of claim 1, which is comprised of 42-46% by weight of an insoluble fiber, 0-2% by weight of soluble fiber, 35-40% by weight of enzymatic starch, 6-10% by weight of protein, 2-4% by weight of ash with the balance being water.

3. The product of claim 2, which is comprised of about 45% by weight insoluble fiber, about 1% by weight soluble fiber, about 36% by weight of enzymatic starch, about 8% by weight of protein, about 3% by weight of ash with the balance being water.

4. The fiber product of claim 1, which is comprised of about 45% by weight of insoluble fiber composed primarily of hemicellulose and pectin and about 36% by weight pea starch.

5. The fiber product of claim 1, wherein said seed is obtained from the plant, Pisum sativum.

6. A method of prophylatically treating animals or human beings with respect to blood glucose levels, comprising:
administering to said animal or human being a prophylatically effective amount of the fiber-containing product of claim 1.

7. A method of treating human beings or animals exhibiting elevated blood glucose levels, comprising:
administering to said human being or animal a therapeutically effective amount of the fiber-containing product of claim 1.

8. An edible composition comprising:
a foodstuff in admixture with the fiber-containing product of claim 1.

9. The edible composition of claim 8, wherein the foodstuff is such that when combined with said fiber containing product it can be formed into an expanded and crisp edible product.

10. The edible composition of claim 8, wherein the foodstuff is a confectionery in combination with said fiber containing product having a particle size of 15 to 30 μm.

11. The edible composition of claim 8, wherein said foodstuff is a minced meat, soup or grain.

12. The edible composition of claim 8, wherein the fiber-containing product has a particle size of 1-2 mm.

13. The edible composition of claim 8, wherein said fiber-containing product has a particle size of 200-400 microns.

14. A process for preparing a fiber-containing product, comprising:
shelling the whole seeds of leguminous plants to remove the cellulose-containing seed coat and then rinsing and steaming the shelled seeds for bacteriologic purposes;

wet grinding said shelled seeds in order to open the plant cells and to dissolve or suspend the starch particles, proteins and soluble components present in the plant cells;

filtering the wet-ground material to obtain a filtrate of said dissolved and/or suspended matter; and washing, filtering and pressing the resulting filter cake obtained to increase the dry matter content thereof before the filtered cake is rasped and dried.

15. The process of claim 14, wherein said filtration is conducted by means of a centrifugal sieve.

16. A process of claim 14, wherein said filter cake is pressed to a dry matter content of about 30% by weight.

17. The process of claim 14, wherein said filter cake is dried in a fluidized bed.

* * * * *